US011026249B2

(12) United States Patent
Li (10) Patent No.: US 11,026,249 B2
(45) Date of Patent: Jun. 1, 2021

(54) METHODS FOR CONFIGURING AND RECEIVING SCHEDULING SIGNALING AND RELATED DEVICES

(71) Applicant: YULONG COMPUTER TELECOMMUNICATION SCIENTIFIC (SHENZHEN) CO., LTD., Shenzhen (CN)

(72) Inventor: Ming-Ju Li, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 325 days.

(21) Appl. No.: 16/088,084

(22) PCT Filed: Oct. 31, 2016

(86) PCT No.: PCT/CN2016/104035
§ 371 (c)(1),
(2) Date: Sep. 25, 2018

(87) PCT Pub. No.: WO2017/161885
PCT Pub. Date: Sep. 28, 2017

(65) Prior Publication Data
US 2020/0305179 A1  Sep. 24, 2020

(30) Foreign Application Priority Data

Mar. 25, 2016  (CN) .......................... 201610178021.1

(51) Int. Cl.
*H04W 4/00* (2018.01)
*H04W 72/12* (2009.01)

(52) U.S. Cl.
CPC .............................. *H04W 72/1278* (2013.01)

(58) Field of Classification Search
CPC ............... H04W 72/042; H04W 76/27; H04W 72/0446; H04W 72/1278; H04L 5/0053; H04L 1/1812
See application file for complete search history.

(56) References Cited

U.S. PATENT DOCUMENTS

2012/0134344 A1* 5/2012 Yu .......................... H04W 72/14
370/336
2013/0003672 A1* 1/2013 Dinan .................. H04B 7/0617
370/329
(Continued)

FOREIGN PATENT DOCUMENTS

CN     104869653 A    8/2015
CN     105682243 A    6/2016
(Continued)

OTHER PUBLICATIONS

Ericsson etc., New Work Item on Licensed-Assisted Access to Unlicensed Spectrum, 3GPP TSG RAN Melting #68 RP-151045, Malmo, Sweden, Jun. 15-18, 2015.

*Primary Examiner* — Atique Ahmed
(74) *Attorney, Agent, or Firm* — ScienBiziP, P.C.

(57) ABSTRACT

The embodiments of the present disclosure provide a method for configuring scheduling signaling on an unlicensed carrier. The method includes: configuring, by a base station, a carrier scheduling configuration message of a scheduled cell on the unlicensed carrier, the carrier scheduling configuration message comprising a scheduling type identifier, a scheduling cell identifier, and Physical Downlink Shared Channel (PDSCH) starting symbol position information of a scheduling cell, and the scheduling type identifier indicating an uplink and downlink semi-persistent self-scheduling, an uplink and downlink semi-persistent cross-carrier scheduling, or a dynamic scheduling; and sending, by the base station, Radio Resource Control (RRC)
(Continued)

signaling to user equipment that carries the carrier scheduling configuration message. Scheduling flexibility on an unlicensed carrier and throughput of communication systems can be improved by implementing the present disclosure.

5 Claims, 9 Drawing Sheets

(56) References Cited

U.S. PATENT DOCUMENTS

| | | | |
|---|---|---|---|
| 2013/0343238 A1* | 12/2013 | Seo | H04L 5/0053 |
| | | | 370/280 |
| 2015/0003302 A1* | 1/2015 | Ekpenyong | H04W 72/14 |
| | | | 370/280 |
| 2016/0219557 A1* | 7/2016 | He | H04L 5/0091 |
| 2017/0013635 A1 | 1/2017 | Quan et al. | |
| 2017/0041805 A1* | 2/2017 | Chandrasekhar | H04L 1/1896 |
| 2017/0111217 A1 | 4/2017 | Kim et al. | |
| 2017/0215202 A1* | 7/2017 | Yang | H04L 5/0055 |
| 2017/0230956 A1* | 8/2017 | Kim | H04B 1/713 |

FOREIGN PATENT DOCUMENTS

| | | |
|---|---|---|
| CN | 105682244 A | 6/2016 |
| WO | 2016028060 A1 | 2/2016 |

\* cited by examiner

FIG. 1

S201 — Receiving, by UE, RRC signaling sent by a base station that carries a carrier scheduling configuration message of a scheduled cell on an unlicensed carrier, the carrier scheduling configuration message including a scheduling type ID, a scheduling cell ID, and PDSCH starting symbol position information of a scheduling cell, the scheduling type ID indicating an uplink and downlink semi-persistent self-scheduling, an uplink and downlink semi-persistent cross-carrier scheduling, or a dynamic scheduling S202 — Monitoring, by the user equipment, UE specific search space in a PDCCH of a scheduling cell and/or a cell on the unlicensed carrier according to the carrier scheduling configuration message

METHODS FOR CONFIGURING AND RECEIVING SCHEDULING SIGNALING AND RELATED DEVICES

CROSS-REFERENCE TO RELATED APPLICATIONS

The present disclosure claims a priority of a Chinese patent application, which is filed in China National Intellectual Property Administration (CNIPA) on Mar. 25, 2016, named "methods for configuring and receiving scheduling signaling and related devices," and numbered 201610178021.1. All contents of Chinese patent application are hereby incorporated by reference in the present application.

FIELD

The present disclosure relates to communication technologies, in particular to methods for configuring and receiving scheduling signaling and related devices.

BACKGROUND

With a rapid increase of communication services, 3rd Generation Partnership Project (3GPP) licensed frequency spectrums become insufficient to provide higher network capacity. In order to further improve the utilization of frequency spectrum resources, 3GPP is discussing how to use unlicensed frequency spectrums such as 2.4 GHz and 5.8 GHz frequency bands. These unlicensed frequency spectrums are currently mainly used by Wireless-Fidelity (Wi-Fi), BLUETOOTH™, radar, medical, and other systems. Generally, access technologies designed for licensed frequency bands, such as Long Term Evolution (LTE), are not suitable for use in unlicensed frequency bands, because access technologies such as LTE have very high requirements for frequency spectrum efficiency and user experience optimization. However, carrier aggregation makes it possible to deploy LTE to unlicensed frequency bands. 3GPP proposes the concept of Licensed Assisted Access (LAA), which uses unlicensed frequency spectrums with the help of LTE licensed frequency spectrums.

Good orthogonality in LTE networks ensures a low interference level, thus there is no need to consider whether there are other base stations or other users around which are transmitting data, in uplink and downlink transmissions of a base station and a user. If LTE is used on an unlicensed frequency band without considering whether other devices are using the unlicensed frequency band, Wi-Fi device is subjected to great interference. As long as there is a service, the LTE will perform a service transmission. No monitoring rule exists. An idle state of a channel can be detected only after the service transmission of the LTE is completed. After that, the Wi-Fi device can perform a transmission.

Therefore, when LTE uses unlicensed frequency bands, one key point is to ensure that the LAA can coexist with the existing access technologies (such as Wi-Fi) on a fair-friendly basis. However, there is no listen before talk (LBT) mechanism to avoid collisions in traditional LTE systems. In order to better coexist with Wi-Fi, an LBT mechanism is needed for the LTE. In this way, if a channel is detected to be busy when the LTE uses the unlicensed frequency spectrum, the frequency band cannot be occupied. If the channel is detected to be idle when the LTE network uses the unlicensed frequency spectrum, the frequency band can be occupied. The prior art does not provide a scheme for performing uplink and downlink scheduling on an unlicensed carrier. Therefore, how to perform uplink and downlink scheduling on an unlicensed carrier is a hot research topic.

SUMMARY

The technical problem to be solved by the embodiments of the present disclosure is to provide methods for configuring and receiving scheduling signaling, base stations, and user equipment, to improve flexibility of scheduling and throughput of communication systems.

In order to solve the above-mentioned technical problem, a method for configuring scheduling signaling on an unlicensed carrier is provided in one embodiment of the present disclosure, the method including:

configuring, by a base station, a carrier scheduling configuration message of a scheduled cell on the unlicensed carrier, the carrier scheduling configuration message including a scheduling type identifier, a scheduling cell identifier, and Physical Downlink Shared Channel (PDSCH) starting symbol position information of a scheduling cell, and the scheduling type identifier indicating an uplink and downlink semi-persistent self-scheduling, an uplink and downlink semi-persistent cross-carrier scheduling, or a dynamic scheduling; and sending, by the base station, Radio Resource Control (RRC) signaling to user equipment (UE) that carries the carrier scheduling configuration message.

Correspondingly, a method for receiving scheduling signaling on an unlicensed carrier is further provided in one embodiment of the present disclosure, the method including:

receiving, by UE, RRC signaling sent by a base station that carries a carrier scheduling configuration message of a scheduled cell on the unlicensed carrier, the carrier scheduling configuration message including a scheduling type identifier, a scheduling cell identifier, and PDSCH starting symbol position information of a scheduling cell, and the scheduling type identifier indicating an uplink and downlink semi-persistent self-scheduling, an uplink and downlink semi-persistent cross-carrier scheduling, or a dynamic scheduling; and monitoring, by the UE, UE specific search space in a Physical Downlink Control Channel (PDCCH) of a scheduling cell and/or a cell on the unlicensed carrier according to the carrier scheduling configuration message.

Correspondingly, a method for receiving scheduling signaling on an unlicensed carrier is further provided in one embodiment of the present disclosure, the method including:

receiving, by UE, RRC signaling sent by a base station that carries a carrier scheduling configuration message and carrier type information of a scheduled cell on the unlicensed carrier, the carrier scheduling configuration message including a scheduling type identifier, a scheduling cell identifier, and PDSCH starting symbol position information of a scheduling cell, and the scheduling type identifier indicating an uplink and downlink self-scheduling or an uplink and downlink cross-carrier scheduling;

acquiring, by the UE, a carrier type of the scheduled cell according to the carrier type information; and monitoring, by the UE, UE specific search space in a PDCCH of the scheduling cell and/or a cell on the unlicensed carrier according to the carrier scheduling configuration message and the carrier type.

Implementation of the embodiments of the present disclosure will have the following advantages:

the base station separately configures scheduling signaling for semi-persistent scheduling and dynamic scheduling based on a feature that unlicensed carriers cannot be continuously occupied, so that the base station can schedule transmission resources according different distribution modes flexibly, improving a throughput of a communication system.

BRIEF DESCRIPTION OF THE DRAWINGS

In order to describe the technical solutions in embodiments of the present disclosure or in the prior art more clearly, the following briefly introduces the accompanying drawings needed for describing the embodiments. Obviously, the accompanying drawings in the following description show some embodiments of the present disclosure, and persons of ordinary skill in the art may still derive other drawings from these accompanying drawings without creative effort.

DETAILED DESCRIPTION

The following clearly and completely describes the technical solutions in the embodiments of the present disclosure with reference to the accompanying drawings in the embodiments of the present disclosure. Obviously, the described embodiments are a part rather than all of the embodiments of the present disclosure. All other embodiments acquired by persons of ordinary skill in the art based on the embodiments of the present disclosure without creative effort shall fall within the protective scope of the present disclosure.

Figure 1:
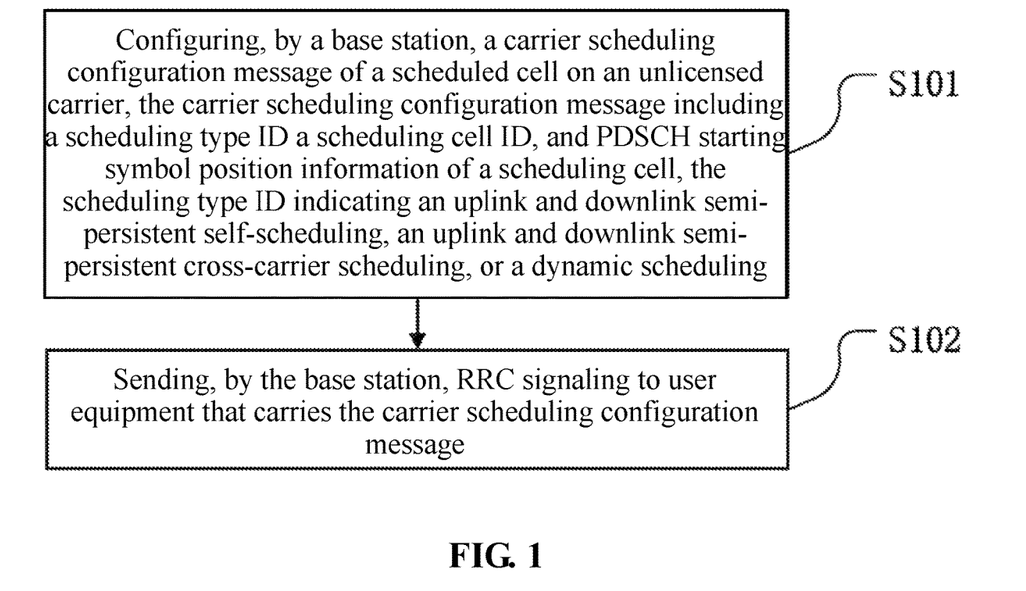
FIG. 1 is a flow chart of a method for configuring scheduling signaling on an unlicensed carrier in one embodiment of the present disclosure.

FIG. 1 is a flow chart of a method for configuring scheduling signaling on an unlicensed carrier in one embodiment of the present disclosure. In the embodiment of the present disclosure, the method includes:

S101 of, configuring, by a base station, a carrier scheduling configuration message of a scheduled cell on the unlicensed carrier. The carrier scheduling configuration message may include a scheduling type identifier, a scheduling cell identifier, and Physical Downlink Shared Channel (PDSCH) starting symbol position information of a scheduling cell. The scheduling type identifier may indicate an uplink and downlink semi-persistent self-scheduling, an uplink and downlink semi-persistent cross-carrier scheduling, or a dynamic scheduling.

Specifically, the carrier scheduling configuration message may be used to indicate related parameters for scheduling a cell, i.e. a current Licensed Assisted Access (LAA) secondary cell (SCell) on the unlicensed carrier. The scheduling type identifier indicates scheduling types in an uplink direction and a downlink direction. The scheduling types indicated by the scheduling type identifier may include at least three types: uplink and downlink semi-persistent self-scheduling, uplink and downlink semi-persistent cross-carrier scheduling, and dynamic scheduling. Uplink and downlink semi-persistent self-scheduling denotes that both uplink scheduling and downlink scheduling are semi-persistent self-scheduling, that is, an LAA SCell sends its own resource scheduling information. Uplink and downlink semi-persistent cross-carrier scheduling denotes that both uplink scheduling and downlink scheduling are semi-persistent cross-carrier scheduling, that is, other serving cells (for example, a primary serving cell on a licensed carrier) send the resource scheduling information of the LAA SCell. Dynamic scheduling denotes that both uplink scheduling and downlink scheduling are dynamic scheduling, that is, the uplink scheduling and the downlink scheduling can dynamically switch between cross-carrier scheduling and self-scheduling. The scheduling cell identifier indicates an identity of a cell performing the scheduling. The uplink scheduling and the downlink scheduling are performed by the same cell. The PDSCH starting symbol position information of the scheduling cell indicates a position of a PDSCH starting symbol of the cell performing the scheduling. For a self-scheduling, a scheduling cell and a scheduled cell are both cells on the unlicensed carrier, i.e. LAA SCells; for a cross-carrier scheduling, the scheduled cell is a cell on the unlicensed carrier, i.e. an LAA SCell, and the scheduling cell is a serving cell other than a cell on the unlicensed carrier, such as a primary serving cell on a licensed carrier.

It should be noted that, for the scheduling type, the uplink direction and the downlink direction may be distinguished. The scheduling type in the uplink direction and the scheduling type in the downlink direction can be represented by two different identifiers, hence the scheduling types in the uplink direction and the downlink direction can be distinguished.

S102 of, sending, by the base station, Radio Resource Control (RRC) signaling to user equipment that carries the carrier scheduling configuration message.

Specifically, the base station may send, to the user equipment, the RRC signaling that carries the carrier scheduling configuration message, and the user equipment may receive uplink scheduling signaling or downlink scheduling signaling on a specified cell according to an indication of the carrier scheduling configuration message.

Optionally, the scheduling type identifier may be represented by two bits.

Specifically, the scheduling type identifier may be represented by two bits. The base station may set different values of the bits to indicate different scheduling types. For example, the scheduling type identifier is cif-presence. A value of 01 of the cif-presence indicates that the scheduling type is a semi-persistent cross-carrier scheduling. A value of 00 of the cif-presence indicates that the scheduling type is a semi-persistent self-scheduling. A value of 10 of the cif-presence indicates that the scheduling type is a dynamic scheduling.

It should be noted that corresponding relationship between values of the two bits and scheduling types is not limited to the above, and may be set as needed.

It can be seen from the above embodiment that the base station separately configures scheduling signaling for semi-persistent scheduling and dynamic scheduling based on a feature that unlicensed carriers cannot be continuously occupied, so that the base station can schedule transmission resources according different distribution modes flexibly, improving a throughput of a communication system.

Figure 2:
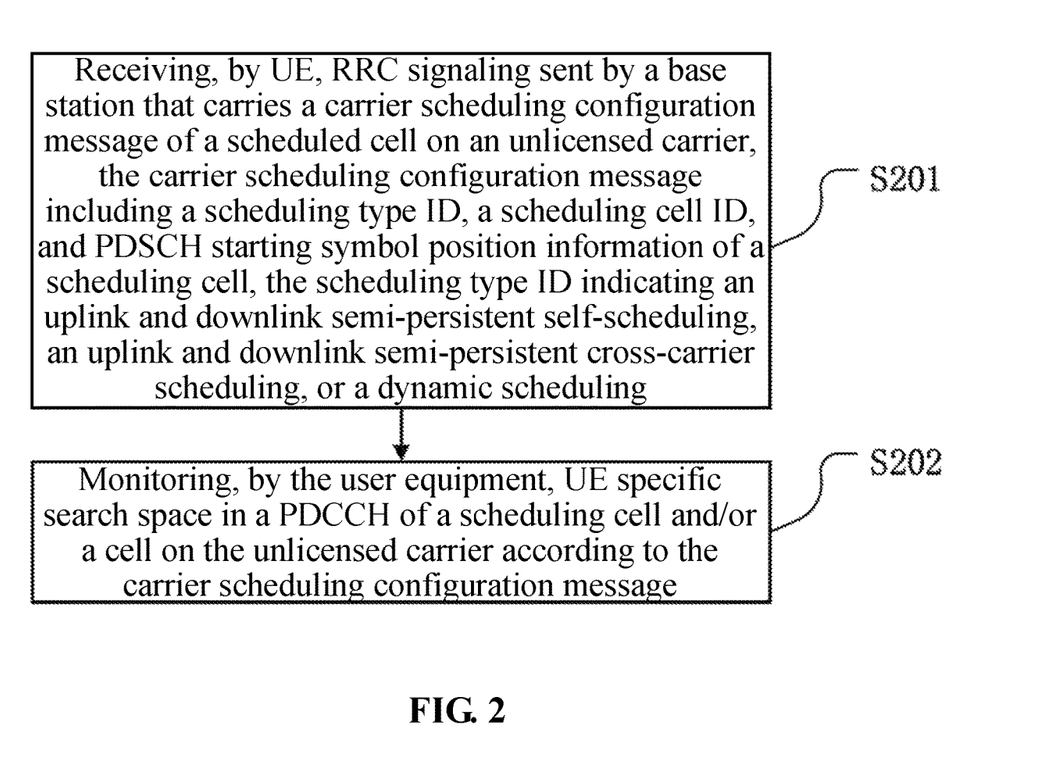
FIG. 2 is a flow chart of a method for receiving scheduling signaling on an unlicensed carrier in one embodiment of the present disclosure.

FIG. 2 is a flow chart of a method for receiving scheduling signaling on an unlicensed carrier in one embodiment of the present disclosure. In the embodiment of the present disclosure, the method includes:

S201 of, receiving, by user equipment (UE), RRC signaling sent by a base station that carries a carrier scheduling configuration message of a scheduled cell on the unlicensed carrier. The carrier scheduling configuration message may include a scheduling type identifier, a scheduling cell identifier, and PDSCH starting symbol position information of a scheduling cell.

Specifically, the user equipment may receive the RRC signaling sent by the base station that carries the carrier scheduling configuration message of the scheduled cell on the unlicensed carrier, and parse the RRC signaling to obtain related parameters in the carrier scheduling configuration message. The scheduling type identifier indicates scheduling types in an uplink direction and a downlink direction. The scheduling type identifier may indicate at least three scheduling types: uplink and downlink semi-persistent self-scheduling, uplink and downlink semi-persistent cross-carrier scheduling, and dynamic scheduling. Uplink and downlink semi-persistent self-scheduling denotes that both uplink scheduling and downlink scheduling are semi-persistent self-scheduling. Uplink and downlink semi-persistent cross-carrier scheduling denotes that both uplink scheduling and downlink scheduling are semi-persistent cross-carrier scheduling. Dynamic scheduling denotes that both uplink scheduling and downlink scheduling are dynamic scheduling, that is, the uplink scheduling and the downlink scheduling can dynamically switch between cross-carrier scheduling and self-scheduling. The scheduling cell identifier indicates an identity of a cell performing scheduling. The uplink scheduling and the downlink scheduling are performed by the same cell. The PDSCH starting symbol position information of the scheduling cell indicates a position of a PDSCH starting symbol of the cell performing the scheduling.

S202 of, monitoring, by the user equipment, UE specific search space in a Physical Downlink Control Channel (PDCCH) of a scheduling cell and/or a cell on the unlicensed carrier according to the carrier scheduling configuration message.

Specifically, the user equipment may determine an uplink and downlink scheduling type, and monitor the UE specific search space in the PDCCH of the scheduling cell and/or the cell on the unlicensed carrier according to different scheduling types.

Optionally, the monitoring, by the user equipment, UE specific search space in a PDCCH of the scheduling cell and/or a cell on the unlicensed carrier according to the carrier scheduling configuration message may include:

determining, by the user equipment, a scheduling type according to the scheduling type identifier;

monitoring, by the user equipment, the UE specific search space in the PDCCH of the cell on the current unlicensed carrier, i.e. a current LAA SCell, to obtain uplink scheduling information and downlink scheduling information, upon the condition that the scheduling type identifier indicates an uplink and downlink semi-persistent self-scheduling;

monitoring, by the user equipment, the UE specific search space in the PDCCH of the scheduling cell according to the scheduling cell identifier and the PDSCH starting symbol position information of the scheduling cell, to obtain the uplink scheduling information and the downlink scheduling information, upon the condition that the scheduling type identifier indicates an uplink and downlink semi-persistent cross-carrier scheduling; and monitoring, by the user equipment, the UE specific search space in the PDCCH of the cell on the unlicensed carrier, i.e. the current LAA SCell, and the scheduling cell, to obtain the uplink scheduling information and the downlink scheduling information, upon the condition that the scheduling type identifier indicates a dynamic scheduling.

Figure 3:
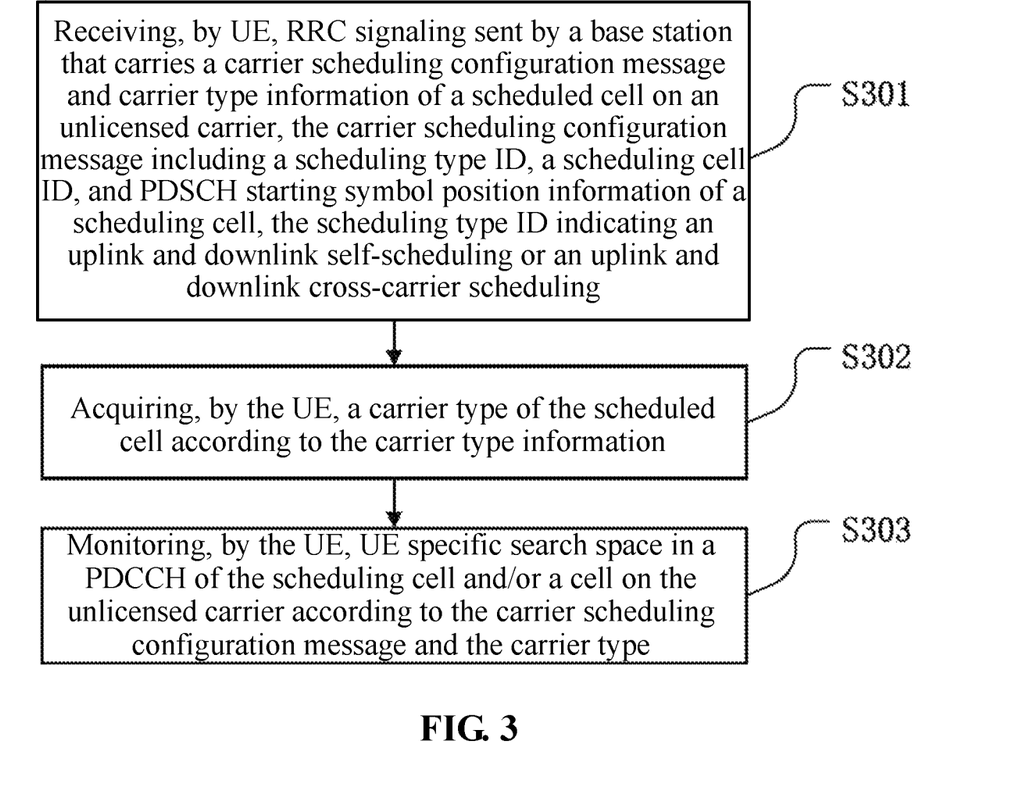
FIG. 3 is another flow chart of a method for receiving scheduling signaling on an unlicensed carrier in one embodiment of the present disclosure.

Specifically, the user equipment may determine an uplink and downlink scheduling type, and monitor the UE specific search space in the PDCCH of the scheduling cell and/or the cell on the unlicensed carrier according to different scheduling types. When the user equipment determines that the scheduling type is an uplink and downlink semi-persistent self-scheduling, the user equipment directly monitors the UE specific search space in the PDCCH of the cell on the unlicensed carrier to obtain the uplink scheduling information and the downlink scheduling information, because the base station does not configure specific values of the scheduling cell identifier and the PDSCH starting symbol position information of the scheduling cell. When the user equipment determines that the scheduling type is an uplink and downlink cross-carrier scheduling, the user equipment monitors the UE specific search space in the PDCCH of the scheduling cell according to the scheduling cell identifier and the PDSCH starting symbol position information of the scheduling cell, to obtain the uplink scheduling information and the downlink scheduling information, because the base station has configured specific values of the scheduling cell identifier and the PDSCH starting symbol position information of the scheduling cell. When the user equipment determines that the scheduling type is dynamic scheduling, the user equipment needs to simultaneously monitor the cell on the current unlicensed carrier and the scheduling cell according to the scheduling cell identifier and the cell corresponding to the scheduling cell identifier, to obtain the uplink scheduling information and the downlink scheduling information FIG. 3 is another flow chart of a method for receiving scheduling signaling on an unlicensed carrier in one embodiment of the present disclosure. In the embodiment of the present disclosure, the method includes:

S301 of, receiving, by user equipment (UE), RRC signaling sent by a base station that carries a carrier scheduling configuration message and carrier type information of a scheduled cell on the unlicensed carrier. The carrier scheduling configuration message may include a scheduling type identifier, a scheduling cell identifier, and PDSCH starting symbol position information of a scheduling cell. The scheduling type identifier may indicate an uplink and downlink self-scheduling or an uplink and downlink cross-carrier scheduling.

Specifically, the carrier scheduling configuration message may be used to indicate related parameters for scheduling an LAA SCell on the unlicensed carrier. Scheduling types do not differentiate between uplink and downlink. The scheduling type identifier indicates an uplink and downlink self-scheduling or an uplink and downlink cross-carrier scheduling. The scheduling cell identifier indicates an identity of a cell performing the scheduling. The PDSCH starting symbol position information of the scheduling cell indicates a position of a PDSCH starting symbol of the cell performing the scheduling. The carrier type information indicates a carrier type of the scheduled cell, i.e. the LAA SCell on the current unlicensed carrier. The carrier type may include a licensed carrier and an unlicensed carrier.

In one possible embodiment, the scheduling type identifier may be represented by one bit. For example, the scheduling type identifier is cif-presence. A value of 1 of the cif-presence indicates that the scheduling type is an uplink and downlink cross-carrier scheduling. A value of 0 of the cif-presence indicates that the scheduling type is an uplink and downlink self-scheduling. A value of 10 of the cif-presence indicates that the scheduling type is dynamic scheduling.

S302 of, acquiring, by the user equipment, a carrier type of the current scheduled cell according to the carrier type information.

Specifically, the user equipment may parse the uplink scheduling type identifier and the downlink scheduling type identifier included in the carrier scheduling configuration message, and determine the scheduling type in the uplink direction and the scheduling type in the downlink direction.

S303 of, monitoring, by the user equipment, UE specific search space in a PDCCH of the scheduling cell and/or a cell on the unlicensed carrier according to the carrier scheduling configuration message and the carrier type.

Optionally, acquiring, by the user equipment, a carrier type of the scheduled cell according to the carrier type information may include:

determining, by the user equipment, that the carrier type of the scheduled cell is a licensed carrier or an unlicensed carrier according to carrier frequency information or a carrier type indicator carried in the carrier type information.

Specifically, the user may determine the carrier type of the scheduled cell (i.e., the cell on the unlicensed carrier) according to a frequency point of the scheduled cell, or determine the carrier type according to the carrier type indicator. For example, a value of 1 of the carrier type indicator indicates that the carrier type is an unlicensed carrier, and a value of 0 of the carrier type indicator indicates that the carrier type is a licensed carrier.

Optionally, monitoring, by the user equipment, UE specific search space in a PDCCH of the scheduling cell and/or a cell on the unlicensed carrier according to the carrier scheduling configuration message and the carrier type may include:

determining, by the user equipment, that the scheduling type is an uplink and downlink semi-persistent cross-carrier scheduling, and monitoring the UE specific search space in the PDCCH of the scheduling cell, to obtain uplink scheduling information and downlink scheduling information, upon the condition that the carrier type is a licensed carrier, and the scheduling type identifier indicates an uplink and downlink cross-carrier scheduling; and determining, by the user equipment, that the scheduling type is a dynamic scheduling, and monitoring the UE specific search space in the PDCCH of the cell on the unlicensed carrier, i.e. a current LAA SCell and the scheduling cell, to obtain the uplink scheduling information and the downlink scheduling information, upon the condition that the carrier type is an unlicensed carrier, and the scheduling type identifier indicates an uplink and downlink cross-carrier scheduling.

Specifically, the user equipment may re-determine an actual scheduling type according to the carrier type of the scheduled cell and the scheduling type indicated by the scheduling type identifier. If the carrier type is a licensed carrier, and the scheduling type identifier indicates an uplink and downlink cross-carrier scheduling, the user equipment determines that the scheduling type is an uplink and downlink semi-persistent cross-carrier scheduling, and monitors the UE specific search space in the PDCCH of the scheduling cell, to obtain uplink scheduling information and downlink scheduling information. If the carrier type is an unlicensed carrier, and the scheduling type identifier indicates an uplink and downlink cross-carrier scheduling, the user equipment determines that the scheduling type is a dynamic scheduling, and simultaneously monitors the UE specific search space in the PDCCH of the cell on the unlicensed carrier and the scheduling cell, to obtain the uplink scheduling information and the downlink scheduling information.

Figure 4:
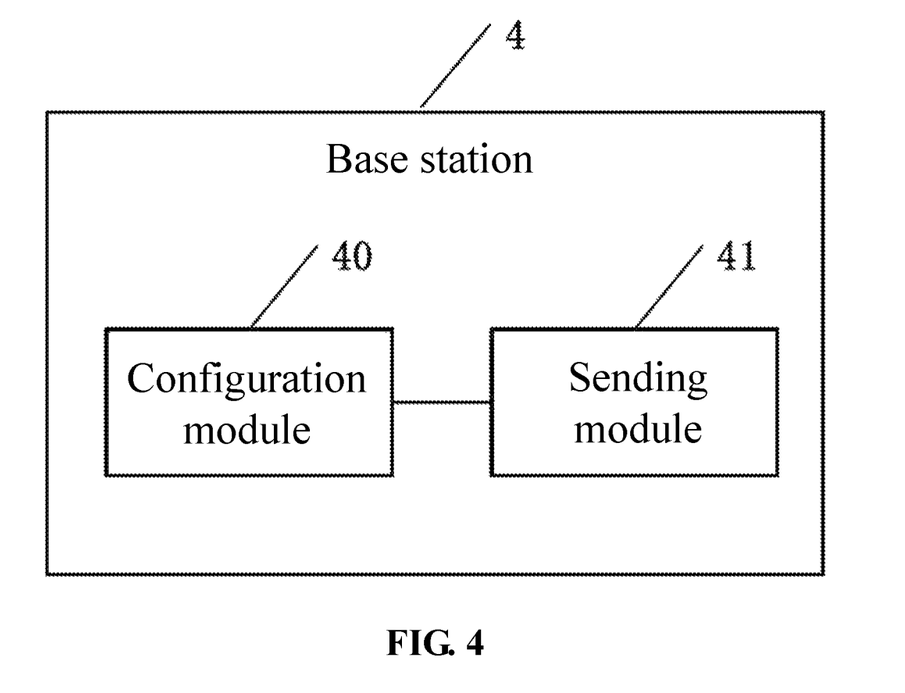
FIG. 4 is a schematic structural diagram of a base station in one embodiment of the present disclosure.

FIG. 4 is a schematic structural diagram of a base station in one embodiment of the present disclosure. The base station in the embodiment of the present disclosure executes the method for configuring scheduling signaling on an unlicensed carrier of FIG. 1. The terms and processes involved may refer to the embodiment of FIG. 1. The base station 4 may include: a configuration module 40 and a sending module 41.

The configuration module 40 is configured to configure a carrier scheduling configuration message of a scheduled cell on the unlicensed carrier. The carrier scheduling configuration message may include a scheduling type identifier, a scheduling cell identifier, and Physical Downlink Shared Channel (PDSCH) starting symbol position information of a scheduling cell. The scheduling type identifier may indicate an uplink and downlink semi-persistent self-scheduling, an uplink and downlink semi-persistent cross-carrier scheduling, or a dynamic scheduling.

The sending module 41 is configured to send RRC signaling to user equipment that carries the carrier scheduling configuration message.

Optionally, the scheduling type identifier may be represented by two bits.

This embodiment of the present disclosure and the method embodiment of FIG. 1 are based on the same concept, and the technical effects thereof are also the same. The processes in detail can refer to the description of the method embodiment 1, and are not repeated here.

Figure 5:
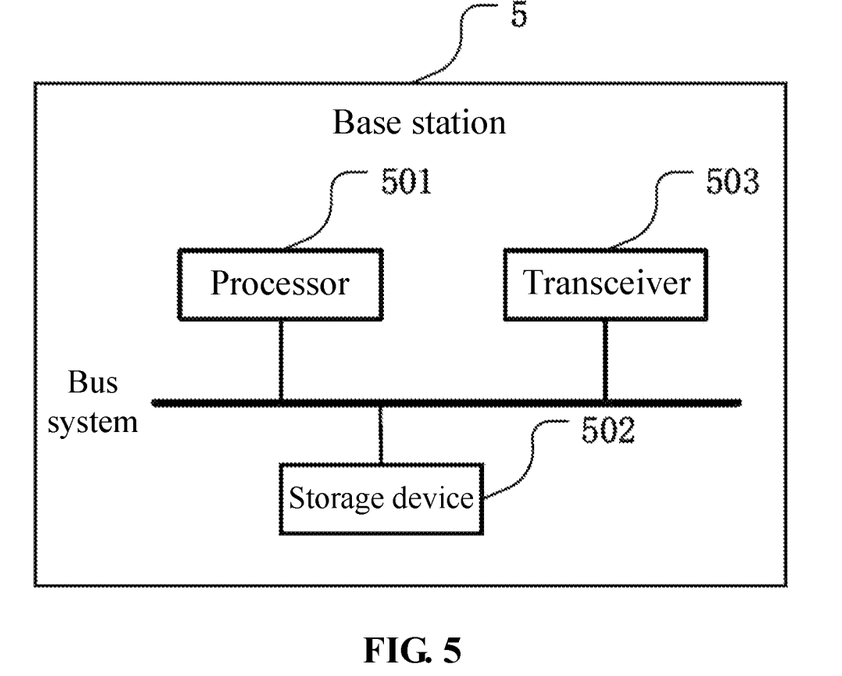
FIG. 5 is another schematic structural diagram of a base station in one embodiment of the present disclosure.

FIG. 5 is another schematic structural diagram of a base station in one embodiment of the present disclosure. In the embodiment of the present disclosure, the base station 5 may include a processor 501, a storage device 502, and a transceiver 503. The transceiver 503 is used for sending and receiving data with external devices. The number of processors 501 in the base station 5 can be one or more. In some embodiments of the present disclosure, the processor 6501, the storage device 502, and the transceiver 503 may be connected through a bus system or other means. The base station 5 may be used for executing the method shown in FIG. 1. The meaning and examples of the terms involved in this embodiment may refer to the embodiment of FIG. 1, and details are not repeated here.

The storage device 502 stores program codes, and the processor 501 can call the program codes stored in the storage device 502 to perform the following operations:

configuring a carrier scheduling configuration message of a scheduled cell on the unlicensed carrier, wherein the carrier scheduling configuration message may include a scheduling type identifier, a scheduling cell identifier, and Physical Downlink Shared Channel (PDSCH) starting symbol position information of a scheduling cell, and the scheduling type identifier may indicate an uplink and downlink semi-persistent self-scheduling, an uplink and downlink semi-persistent cross-carrier scheduling, or a dynamic scheduling; and sending RRC signaling to user equipment that carries the carrier scheduling configuration message.

In one possible embodiment of the present disclosure, the scheduling type identifier may be represented by two bits.

Figure 6:
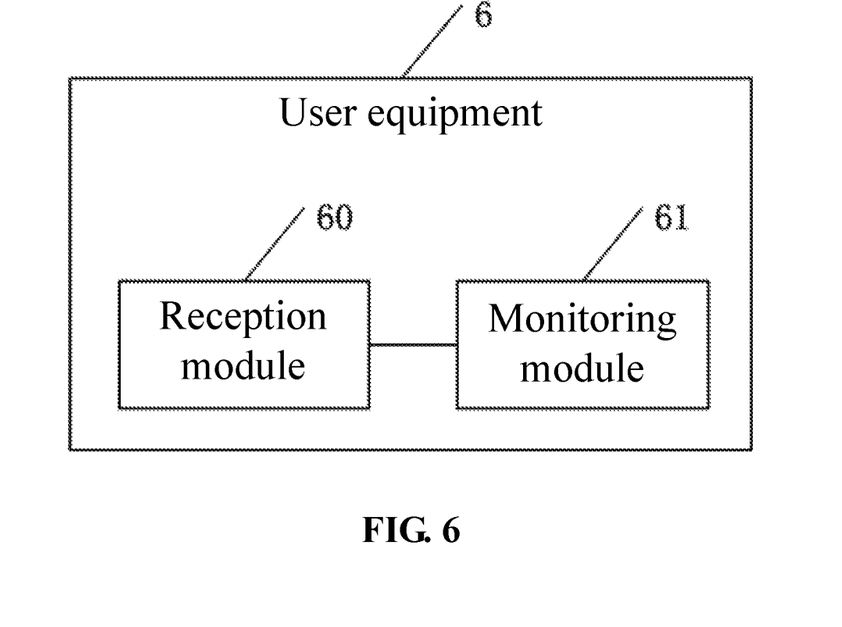
FIG. 6 is a schematic structural diagram of user equipment in a first embodiment of the present disclosure.

FIG. 6 is schematic structural diagram of user equipment in a first embodiment of the present disclosure. The user equipment in the embodiment of the present disclosure executes the method for receiving scheduling signaling on an unlicensed carrier of FIG. 2. The terms and processes involved may refer to the embodiment of FIG. 2. The user equipment 6 may include: a reception module 60 and a monitoring module 61.

The reception module 60 is configured to receive Radio Resource Control (RRC) signaling sent by a base station that carries a carrier scheduling configuration message of a scheduled cell on an unlicensed carrier. The carrier scheduling configuration message may include a scheduling type identifier, a scheduling cell identifier, and PDSCH starting symbol position information of a scheduling cell. The scheduling type identifier may indicate an uplink and downlink semi-persistent self-scheduling, an uplink and downlink semi-persistent cross-carrier scheduling, or a dynamic scheduling.

The monitoring module 61 is configured to monitor UE specific search space in a Physical Downlink Control Channel (PDCCH) of a scheduling cell and/or a cell on the unlicensed carrier according to the carrier scheduling configuration message.

Optionally, the monitoring module 61 is specially configured to:

determine a scheduling type according to the scheduling type identifier;

monitor the UE specific search space in the PDCCH of the cell on the unlicensed carrier, i.e. a current LAA SCell, to obtain uplink scheduling information and downlink scheduling information, upon the condition that the scheduling type identifier indicates an uplink and downlink semi-persistent self-scheduling;

monitor the UE specific search space in the PDCCH of the scheduling cell according to the scheduling cell identifier and the PDSCH starting symbol position information of the scheduling cell, to obtain the uplink scheduling information and the downlink scheduling information, upon the condition that the scheduling type identifier indicates an uplink and downlink semi-persistent cross-carrier scheduling; and monitor, by the user equipment, the UE specific search space in the PDCCH of the cell on the unlicensed carrier and the scheduling cell, to obtain the uplink scheduling information and the downlink scheduling information, upon the condition that the scheduling type identifier indicates a dynamic scheduling.

This embodiment of the present disclosure and the method embodiment of FIG. 2 are based on the same concept, and the technical effects thereof are also the same. The processes in detail can refer to the description of the method embodiment 2, and are not repeated here.

Figure 7:
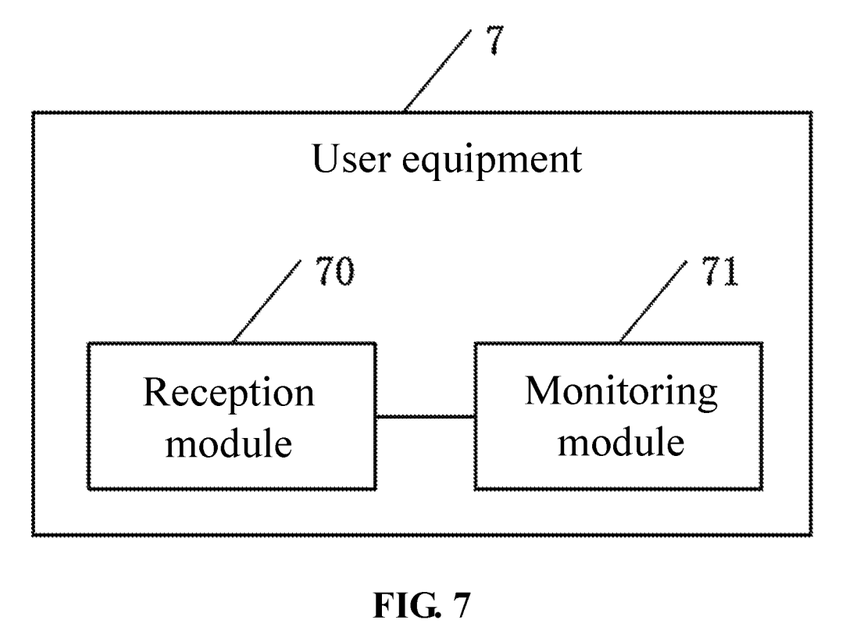
FIG. 7 is a schematic structural diagram of user equipment in s second embodiment of the present disclosure.

FIG. 7 is schematic structural diagram of user equipment in a second embodiment of the present disclosure. In the embodiment of the present disclosure, the user equipment 7 may include a processor 701, a storage device 702, and a transceiver 703. The transceiver 703 is used for sending and receiving data with external devices. The number of processors 701 in the user equipment 7 can be one or more. In some embodiments of the present disclosure, the processor 701, the storage device 702, and the transceiver 703 may be connected through a bus system or other means. The user equipment 7 can be used for executing the method shown in FIG. 2. The meaning and examples of the terms involved in this embodiment may refer to the embodiment of FIG. 2, and details are not repeated here.

The storage device 702 stores program codes, and the processor 701 can execute the program codes stored in the storage device 702 to perform the following operations:

receiving Radio Resource Control (RRC) signaling sent by a base station that carries a carrier scheduling configuration message of a scheduled cell on an unlicensed carrier, wherein the carrier scheduling configuration message may include a scheduling type identifier, a scheduling cell identifier, and PDSCH starting symbol position information of a scheduling cell, and the scheduling type identifier may indicate an uplink and downlink semi-persistent self-scheduling, an uplink and downlink semi-persistent cross-carrier scheduling, or a dynamic scheduling; and monitoring UE specific search space in a Physical Downlink Control Channel (PDCCH) of a scheduling cell and/or a cell on the unlicensed carrier according to the carrier scheduling configuration message.

In one possible embodiment of the present disclosure, monitoring, performed by the processor 701, UE specific search space in a Physical Downlink Control Channel (PDCCH) of a scheduling cell and/or a cell on the unlicensed carrier according to the carrier scheduling configuration message may include:

determining a scheduling type according to the scheduling type identifier;

monitoring the UE specific search space in the PDCCH of the cell on the unlicensed carrier, i.e. a current LAA SCell, to obtain uplink scheduling information and downlink scheduling information, upon the condition that the scheduling type identifier indicates an uplink and downlink semi-persistent self-scheduling;

monitoring the UE specific search space in the PDCCH of the scheduling cell according to the scheduling cell identifier and the PDSCH starting symbol position information of the scheduling cell, to obtain the uplink scheduling information and the downlink scheduling information, upon the condition that the scheduling type identifier indicates an uplink and downlink semi-persistent cross-carrier scheduling; and monitoring, by the user equipment, the UE specific search space in the PDCCH of the cell on the unlicensed carrier and the scheduling cell, to obtain the uplink scheduling information and the downlink scheduling information, upon the condition that the scheduling type identifier indicates a dynamic scheduling.

Figure 8:
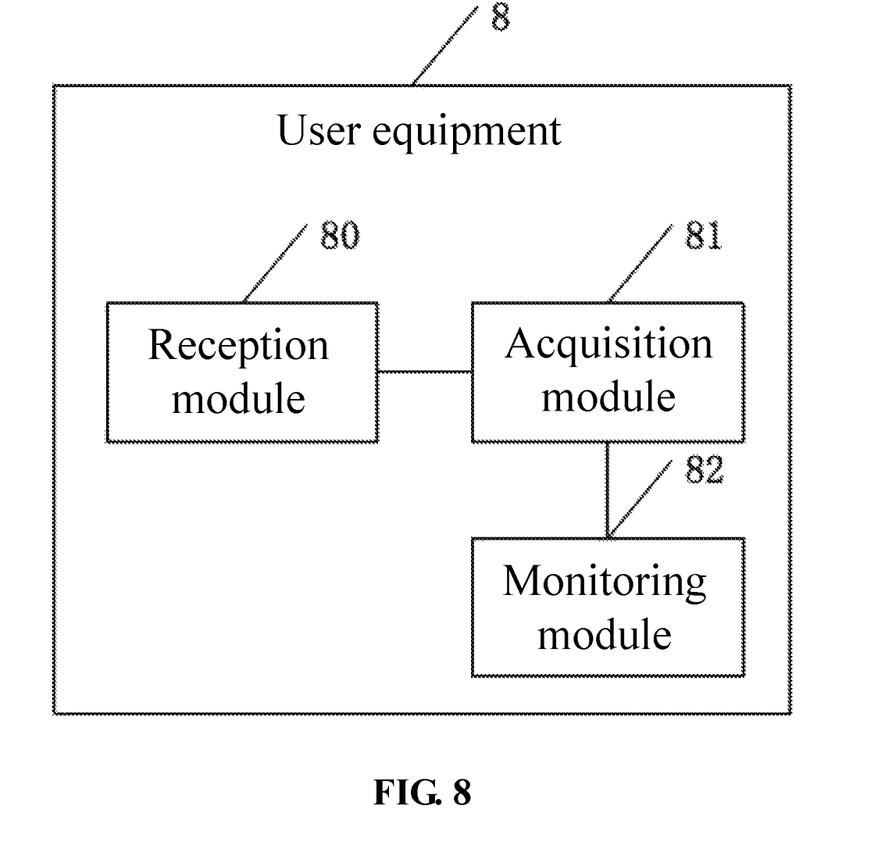
FIG. 8 is a schematic structural diagram of user equipment in a third embodiment of the present disclosure.

FIG. 8 is schematic structural diagram of user equipment in a third embodiment of the present disclosure. The user equipment in this embodiment of the present disclosure executes the method for receiving scheduling signaling on an unlicensed carrier of FIG. 3. The terms and processes involved may refer to the embodiment of FIG. 3. The user equipment 7 may include: a reception module 80, an acquisition module 81, and a monitoring module 82.

The reception module 80 is configured to receive RRC signaling sent by a base station that carries a carrier scheduling configuration message and carrier type information of a scheduled cell on an unlicensed carrier. The carrier scheduling configuration message may include a scheduling type identifier, a scheduling cell identifier, and PDSCH starting symbol position information of a scheduling cell. The scheduling type identifier may indicate an uplink and downlink self-scheduling or an uplink and downlink cross-carrier scheduling.

The acquisition module 81 is configured to acquire a carrier type of scheduled cell according to the carrier type information.

The monitoring module 82 is configured to monitor UE specific search space in a PDCCH of the scheduling cell and/or a cell on the unlicensed carrier according to the carrier scheduling configuration message and the carrier type.

Optionally, the acquisition module 81 may be specifically configured to:

determine that the carrier type of the scheduled cell according to carrier frequency information or a carrier type indicator carried in the carrier type information.

Optionally, the monitoring module 82 may be specifically configured to:

determine, by the user equipment, that the scheduling type is an uplink and downlink semi-persistent cross-carrier scheduling, and monitor the UE specific search space in the PDCCH of the scheduling cell, to obtain uplink scheduling information and downlink scheduling information, upon the condition that the carrier type is a licensed carrier, and the scheduling type identifier indicates an uplink and downlink cross-carrier scheduling; and determine, by the user equipment, that the scheduling type is a dynamic scheduling, and monitor the UE specific search space in the PDCCH of the cell on the current unlicensed carrier and the scheduling cell, to obtain the uplink scheduling information and the downlink scheduling information, upon the condition that the carrier type is an unlicensed carrier, and the scheduling type identifier indicates an uplink and downlink cross-carrier scheduling.

This embodiment of the present disclosure and the method embodiment of FIG. 3 are based on the same concept, and the technical effects thereof are also the same. The processes in detail can refer to the description of the method embodiment 3, and are not repeated here.

Figure 9:
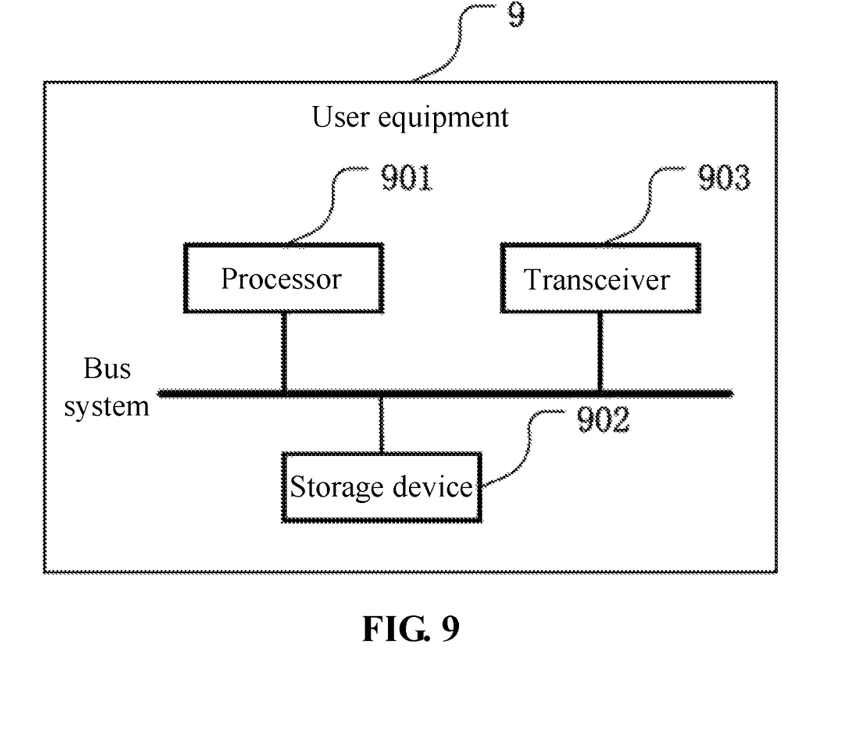
FIG. 9 is a schematic structural diagram of user equipment in a fourth embodiment of the present disclosure.

FIG. 9 is schematic structural diagram of user equipment in a fourth embodiment of the present disclosure. In the embodiment of the present disclosure, the user equipment 9 may include a processor 901, a storage device 902, and a transceiver 903. The transceiver 903 is used for sending and receiving data with external devices. The number of processors 901 in the user equipment 9 can be one or more. In some embodiments of the present disclosure, the processor 901, the storage device 902, and the transceiver 903 may be connected through a bus system or other means. The user equipment 9 can be used for executing the method shown in FIG. 9. The meaning and examples of the terms involved in this embodiment may refer to the embodiment of FIG. 9, and details are not repeated here.

The storage device 902 stores program codes, and the processor 901 can execute the program codes stored in the storage device 902 to perform the following operations:

receiving Radio Resource Control (RRC) signaling sent by a base station that carries a carrier scheduling configuration message and carrier type information of a scheduled cell on an unlicensed carrier, wherein the carrier scheduling configuration message may include a scheduling type identifier, a scheduling cell identifier, and PDSCH starting symbol position information of a scheduling cell, and the scheduling type identifier may indicate an uplink and downlink self-scheduling or an uplink and downlink cross-carrier scheduling;

acquiring a carrier type of the scheduled cell according to the carrier type information; and monitoring UE specific search space in a PDCCH of the scheduling cell and/or a cell on the unlicensed carrier according to the carrier scheduling configuration message and the carrier type.

In one possible embodiment of the present disclosure, acquiring, by the processor 901, a carrier type of the scheduled cell according to the carrier type information may include:

determining the carrier type of the scheduled cell according to carrier frequency information or a carrier type indicator carried in the carrier type information.

In one possible embodiment of the present disclosure, monitoring, performed by the processor 901, UE specific search space in a PDCCH of the scheduling cell and/or a cell on the unlicensed carrier according to the carrier scheduling configuration message and the carrier type may include:

determining that the scheduling type is an uplink and downlink semi-persistent cross-carrier scheduling, and monitoring the UE specific search space in the PDCCH of the scheduling cell, to obtain uplink scheduling information and downlink scheduling information, upon the condition that the carrier type is a licensed carrier, and the scheduling type identifier indicates an uplink and downlink cross-carrier scheduling; and determining that the scheduling type is a dynamic scheduling, and monitoring the UE specific search space in the PDCCH of the cell on the current unlicensed carrier and the scheduling cell, to obtain the uplink scheduling information and the downlink scheduling information, upon the condition that the carrier type is an unlicensed carrier, and the scheduling type identifier indicates an uplink and downlink cross-carrier scheduling.

The user terminal provided by the embodiments of the present disclosure includes, but is not limited to, user terminal equipped with iOS®, Android®, Microsoft® or other operating system, such as a mobile phone. Other user terminal may also be used, such as a laptop or a tablet or a desktop computer with a touch-sensitive surface (e.g., a touch screen display and/or a touch pad).

User equipment including a display and a touch-sensitive surface is hereinafter described. It should be understood, however, that the user equipment can include one or more other physical user interface devices, such as a physical keyboard, a mouse, and/or a joystick.

User equipment generally supports a variety of applications, such as one or more of a drawing application, a rendering application, a word processing application, a web page creation application, a disc editing application, a spreadsheet application, a game application, a phone application, a video conferencing application, an email application, an instant messaging application, a workout support application, a photo management application, a digital camera application, a digital video camera application, a web browsing application, a digital music player application, and/or a digital video player application.

Applications that can be executed on the user equipment can use at least one shared physical user interface device, such as a touch-sensitive surface. One or more functions of the touch-sensitive surface and corresponding information displayed on the user terminal may be adjusted and/or changed from one application to a next application, and/or adjusted and/or varied within applications. In this way, the shared physical architecture of the user equipment, such as a touch-sensitive surface, can support applications with a user interface that is intuitive to the user.

Persons of ordinary skill in the art can understand that all or part of the processes of the above embodiments may be implemented by executing a computer program by related hardware. The program may be stored in a computer readable storage medium. The program, when executed, may implement the flow of the method embodiments as described above. The storage medium may be a magnetic disk, an optical disk, a read-only memory (ROM), or a random access memory (RAM).

The above mentioned descriptions are merely preferred embodiments of the present disclosure, and should not limit the scope of the present disclosure. Persons of ordinary skill in the art can understand that implementing all or part of the processes of the above embodiments, and any modification and equivalent according to the claims of the present disclosure, are still within the scope of the present disclosure.

What is claimed is:

1. A method for configuring scheduling signaling on an unlicensed carrier, comprising:
    configuring, by a base station, a carrier scheduling configuration message of a scheduled cell on the unlicensed carrier, the carrier scheduling configuration message comprising a scheduling type identifier, a scheduling cell identifier, and Physical Downlink Shared Channel (PDSCH) starting symbol position information of a scheduling cell, and the scheduling type identifier indicating an uplink and downlink semi-persistent self-scheduling, an uplink and downlink semi-persistent cross-carrier scheduling, or a dynamic scheduling; and
    sending, by the base station, Radio Resource Control (RRC) signaling to user equipment that carries the carrier scheduling configuration message;
    wherein the scheduling type identifier is represented by two bits, a value of 00 of the scheduling type identifier indicates the uplink and downlink semi-persistent self-scheduling, a value of 01 of the scheduling type identifier indicates the uplink and downlink semi-persistent cross-carrier scheduling, and a value of 10 of the scheduling type identifier indicates the dynamic scheduling.

2. A method for receiving scheduling signaling on an unlicensed carrier, comprising:
    receiving, by user equipment (UE), Radio Resource Control (RRC) signaling sent by a base station that carries a carrier scheduling configuration message of a scheduled cell on the unlicensed carrier, the carrier scheduling configuration message comprising a scheduling type identifier, a scheduling cell identifier, and Physical Downlink Shared Channel (PDSCH) starting symbol position information of a scheduling cell, and the scheduling type identifier indicating an uplink and downlink semi-persistent self-scheduling, an uplink and downlink semi-persistent cross-carrier scheduling, or a dynamic scheduling; and
    monitoring, by the UE, UE specific search space in a Physical Downlink Control Channel (PDCCH) of a scheduling cell and/or a cell on the unlicensed carrier according to the carrier scheduling configuration message;
    wherein monitoring, by the UE, UE specific search space in a PDCCH of a scheduling cell and/or a cell on the unlicensed carrier according to the carrier scheduling configuration message comprises:
        determining, by the UE, a scheduling type according to the scheduling type identifier;
        monitoring, by the UE, the UE specific search space in the PDCCH of the cell on the unlicensed carrier, to obtain uplink scheduling information and downlink scheduling information, upon the condition that the scheduling type identifier indicates an uplink and downlink semi-persistent self-scheduling;
        monitoring, by the UE, the UE specific search space in the PDCCH of the scheduling cell according to the scheduling cell identifier and the PDSCH starting symbol position information of the scheduling cell, to obtain the uplink scheduling information and the downlink scheduling information, upon the condition that the scheduling type identifier indicates an uplink and downlink semi-persistent cross-carrier scheduling; and
        monitoring, by the UE, the UE specific search space in the PDCCH of the cell on the unlicensed carrier and the scheduling cell, to obtain the uplink scheduling information and the downlink scheduling information, upon the condition that the scheduling type identifier indicates a dynamic scheduling;
    wherein the scheduling type identifier is represented by two bits, a value of 00 of the scheduling type identifier indicates the uplink and downlink semi-persistent self-scheduling, a value of 01 of the scheduling type identifier indicates the uplink and downlink semi-persistent cross-carrier scheduling, and a value of 10 of the scheduling type identifier indicates the dynamic scheduling.

3. A method for receiving scheduling signaling on an unlicensed carrier, comprising:
    receiving, by user equipment (UE), Radio Resource Control (RRC) signaling sent by a base station that carries a carrier scheduling configuration message and carrier type information of a scheduled cell on the unlicensed carrier, the carrier scheduling configuration message comprising a scheduling type identifier, a scheduling cell identifier, and Physical Downlink Shared Channel (PDSCH) starting symbol position information of a scheduling cell, and the scheduling type identifier indicating an uplink and downlink self-scheduling or an uplink and downlink cross-carrier scheduling;
    acquiring, by the UE, a carrier type of the scheduled cell according to the carrier type information; and
    monitoring, by the UE, UE specific search space in a Physical Downlink Control Channel (PDCCH) of the scheduling cell and/or a cell on the unlicensed carrier according to the carrier scheduling configuration message and the carrier type;
    wherein the scheduling type identifier is represented by one bit, a value of 0 of the scheduling type identifier indicates the uplink and downlink self-scheduling, and a value of 1 of the scheduling type identifier indicates the uplink and downlink cross-carrier scheduling.

4. The method according to claim 3, wherein acquiring, by the UE, a carrier type of the scheduled cell according to the carrier type information comprises:
    determining, by the UE, the carrier type of the scheduled cell according to carrier frequency information or a carrier type indicator carried in the carrier type information.

5. The method according to claim 3, wherein monitoring, by the UE, UE specific search space in a PDCCH of the scheduling cell and/or a cell on the unlicensed carrier according to the carrier scheduling configuration message and the carrier type comprises:
    determining that the scheduling type is an uplink and downlink semi-persistent cross-carrier scheduling, and monitoring the UE specific search space in the PDCCH of the scheduling cell, to obtain uplink scheduling information and downlink scheduling information, upon the condition that the carrier type is a licensed carrier, and the scheduling type identifier indicates an uplink and downlink cross-carrier scheduling; and determining that the scheduling type is a dynamic scheduling, and monitoring the UE specific search space in the PDCCH of the cell on the unlicensed carrier and the scheduling cell, to obtain the uplink scheduling information and the downlink scheduling information, upon the condition that the carrier type is an unlicensed carrier, and the scheduling type identifier indicates an uplink and downlink cross-carrier scheduling.

* * * * *

UNITED STATES PATENT AND TRADEMARK OFFICE
CERTIFICATE OF CORRECTION

PATENT NO. : 11,026,249 B2
APPLICATION NO. : 16/088084
DATED : June 1, 2021
INVENTOR(S) : Ming-Ju Li Page 1 of 1

It is certified that error appears in the above-identified patent and that said Letters Patent is hereby corrected as shown below:

In the Claims

In Claim 1, at Column 13, Line 33, before "user" add "a".
In Claim 2, at Column 13, Line 52, delete "and" and insert therefor -- wherein --.
In Claim 2, at Column 13, Line 53, delete "indicating" and insert therefor -- indicates --.
In Claim 2, at Column 13, Line 57, before "UE specific" add "a".
In Claim 3, at Column 14, Line 39, delete "and" and insert therefor -- wherein --.
In Claim 3, at Column 14, Lines 39-40, delete "indicating" and insert therefor -- indicates --.
In Claim 3, at Column 14, Line 44, before "UE specific" add "a".
In Claim 5, at Column 14, Line 61, before "monitoring" add "the".
In Claim 5, at Column 14, Line 62, before "UE specific" add "a".

Signed and Sealed this
Twenty-eighth Day of January, 2025

Coke Morgan Stewart
*Acting Director of the United States Patent and Trademark Office*